L. T. CORNELL.
Implement for Capping, Uncapping, and Crimping Cartridge-Shells.
No. 203,594.   Patented May 14, 1878.
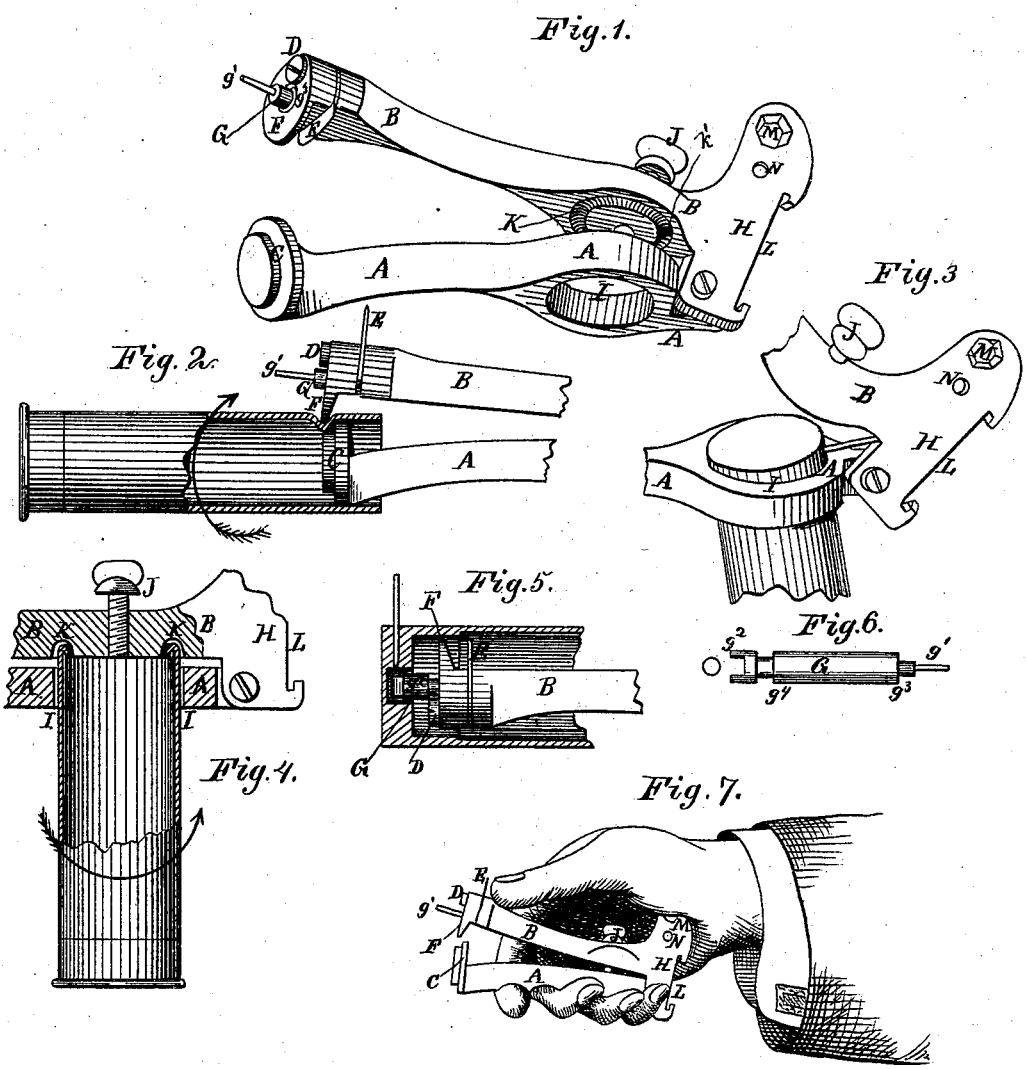

UNITED STATES PATENT OFFICE.

LEWIS T. CORNELL, OF CHICAGO, ILLINOIS.

IMPROVEMENT IN IMPLEMENTS FOR CAPPING, UNCAPPING, AND CRIMPING CARTRIDGE-SHELLS.

Specification forming part of Letters Patent No. 203,594, dated May 14, 1878; application filed March 20, 1878.

*To all whom it may concern:*

Be it known that I, LEWIS T. CORNELL, of Chicago, in the county of Cook and State of Illinois, have invented a new and useful Improvement in Breech-Loading Shell Implements, of which the following is a specification:

Figure 1 is a perspective view of my improved implement. Fig. 2 is a side view of the arms of the same arranged for creasing a shell, the shell being shown partly in section. Fig. 3 is a side perspective view of a part of the device arranged for capping a pin-fire shell. Fig. 4 is a side view, partly in section, of a part of the same arranged for closing the shell, the shell being shown in section. Fig. 5 is a side view of one arm of the device arranged for capping a pin-fire shell, the shell being shown in section. Fig. 6 is a detail side view of the capping and uncapping pin. Fig. 7 shows the device as arranged and held for creasing.

Similar letters of reference indicate corresponding parts.

The object of this invention is to furnish an improved implement for extracting, uncapping, capping, loading, cutting, creasing, and closing breech-loading cartridge-shells, which shall be simple in construction, convenient in use, and effective in operation in either capacity.

The invention consists in the rabbeted disk or head formed upon the outer end of one arm of the implement, to adapt it to serve as a ramrod for pushing wads into shells, and as a support while shell is being cut and creased; in the creaser, pivoted eccentrically to the end of one arm of the implement by a screw and locked in position by a pin, in combination with the rabbeted head formed upon the end of the other arm; in the knife, pivoted eccentrically to the end of one arm of the implement by a screw and locked in place by a pin, in combination with the rabbeted head formed upon the end of the other arm; in the pin, flattened upon one side, having a fork formed upon the end, and having shoulders formed upon its end parts, in combination with the arm, the screw, the cutter, and the creaser; and in the combination of the hinged arm, provided with the rabbeted head and the hole, the hinged arm provided with the groove, the hand-screw, and the cross-head having the T-notch and the holes formed in it, the eccentric cutter, the eccentric creaser, and the forked, shouldered, and flattened pin with each other, to form a tool adapted for use in performing the various operations of uncapping, capping, loading, cutting, creasing, closing, and extracting cartridge-shells, as hereinafter fully described.

A and B are the two arms of the implement, upon the outer end of one of which is formed a disk or circular head, C, which is rabbeted upon its outer side, to form a shoulder for the creasing-flange to be operated against, as shown in Fig. 2. The head C adapts the arm A to be used as a ramrod for pushing wads into shells.

To the end of the other arm, B, are secured, by a screw, D, a knife, E, for cutting off the shell, and a flange, F, for creasing it. The screw D passes through the outer parts of the creaser F and the cutter E, and into the outer part of the end of the said arm, so that either the creaser or cutter may be swung back when the other is to be used.

The creaser F and the cutter E are secured in place for use by a pin, G, which passes through holes in the centers of the said creaser and cutter, and into a hole in the inner part of the end of the arm B. When either the creaser or the cutter is turned back, the pin G passes across the edge of the said turned-back part, so as to fasten it out of the way at the same time that it fastens the other part in working position.

Upon one end of the pin G is formed a point, to adapt it for pushing out the cap in uncapping a shell, and upon its other end is formed a fork for inserting a cap in a pin-fire shell. One side of the pin G is flattened to allow it to pass the head of the screw D, and upon its pin end is formed a shoulder, $g^3$, and around its other end, at the base of the fork $g^2$, is formed a groove, forming a second shoulder, $g^4$, so that, when either end of the pin G is inserted in the hole in the end of the arm B and turned partly around, one of the said shoulders $g^3$ $g^4$ will rest against the head of the said screw D, to prevent the said pin from dropping out.

The rear end of the arm A is hinged to the inner end of the cross-head H, formed upon the rear end of the arm A.

The arms A B, near their rear or hinged ends, are enlarged, and in the enlarged part of the arm A is formed a hole, I, of such a size as to allow the body of the shell to pass through, but not its flange.

In the center of the enlargement of the arm B is a hand-screw, J, the inner end of which projects, so as to force a cap into its seat in a central-fire shell when the said shell is placed in the hole I with its flange resting upon the inner surface of the arm A. In the inner surface of the enlargement of the arm B, around the screw J, as a center, is formed a ring-groove, K, of such a size as to receive the edge of the open end of the shell; and in the bottom of the said groove is formed a grooved projection or cross-rib, $k'$, to bend over the edge of the shell as the said shell is rotated, the groove K keeping the said shell in place and smoothing off its turned-down or closed end.

In the outer edge of the cross-head H is formed a notch, L, with its shoulders recessed to receive the flange of the shell and withdraw it from the gun-barrel.

In the upper end of the cross-head H is formed a polygonal hole, M, to fit upon the base of the nipple and serve as a wrench for screwing it in and out.

In the outer part of the cross-head H is formed a hole, N, to receive the pin of a pin-fire shell to withdraw said shell from the gun-barrel.

In using the device for uncapping a shell, the pin G is arranged as shown in Fig. 1, and the point $g^1$ pushes the cap out as the arm B is pushed into the shell.

In capping a central-fire shell, the anvil is placed in the head of the cartridge-shell, the shell is placed in the hole I, with its flange resting upon the inner side of the arm A, and the arm B is closed down upon it, the screw J coming in contact with the said cap and forcing it into place.

In uncapping a pin-fire shell, the pin is clasped between the arms A B and drawn outward far enough to allow the cap to drop out.

In capping a pin-fire shell, the pin G is arranged with the fork $g^2$ outward. The cap is placed in the fork $g^2$, and is placed in the bottom of the shell, and the pin is forced into the shell until its point enters the cap. The shell is then placed in the hole I in such a position that the end of the pin may rest in the angle between the arm B and the cross-head H, and the said arm B is pressed down, forcing the pin to its place.

In loading the shell, the arm A is used as a rammer for pressing the wads down.

In cutting off the shell, the pin G is taken out, the flange F is turned back, the pin G is inserted, the arm A is inserted in the shell, the arm B is pressed down, pressing the knife E against the side of the shell, and the said shell is turned, the said knife cutting it off evenly.

In creasing the shell, the pin G is withdrawn, the knife E is turned back, the flange F is turned forward, and the pin G is put back. The arm A is then inserted in the shell, the arm B is pressed down, pressing the flange F against the side of the shell, and the said shell is turned, the flange F forming the crease.

In closing the shell, the arms A B are pressed together, the end of the shell is passed through the hole I into the groove K, and the shell is turned, the notched projections $k'$ breaking down and turning in its edge and the groove K smoothing it off.

Having thus described my invention, I claim as new and desire to secure by Letters Patent—

1. The creaser F, pivoted eccentrically to the end of the arm B by a screw, D, and locked in position by a pin, G, in combination with the rabbeted head C, formed upon the end of the arm A, substantially as herein shown and described.

2. The knife F, pivoted eccentrically to the end of the arm B by a screw, and locked in place by a pin, G, in combination with the rabbeted head C, formed upon the end of the arm A, substantially as herein shown and described.

3. The pin G, flattened upon one side, having a fork, $g^2$, formed upon the end, and having shoulders $g^3$ $g^4$ formed upon its end parts, in combination with the arm B, the screw D, the cutter E, and the creaser F, substantially as herein shown and described.

4. The combination of the hinged arm A, provided with the rabbeted head C and the hole I, and hinged arm B, provided with the groove K, the hand-screw J, and the cross-head H, having the T-notch L and the holes M N formed in it, the eccentric cutter E, the eccentric creaser F, and the forked, shouldered, and flattened reversible pin G with each other, to form a tool adapted for use in performing the various operations of uncapping, capping, loading, cutting, creasing, closing, and extracting cartridge-shells, substantially as herein shown and described.

LEWIS TULLY CORNELL.

Witnesses:
ELI WASHBURN,
JAMES H. FISK.